(No Model.)

P. F. O'DWYER.
SHAFT SUPPORT.

No. 415,163. Patented Nov. 12, 1889.

Witnesses,
Jas. J. Maloney.
M. E. Hill.

Inventor,
Patrick F. O'Dwyer,
by Jos. P. Livermore,
Att'y.

UNITED STATES PATENT OFFICE.

PATRICK F. O'DWYER, OF WALTHAM, MASSACHUSETTS, ASSIGNOR OF ONE-HALF TO ALFRED M. GOODALE, OF SAME PLACE.

SHAFT-SUPPORT.

SPECIFICATION forming part of Letters Patent No. 415,163, dated November 12, 1889.

Application filed July 16, 1889. Serial No. 317,650. (No model.)

*To all whom it may concern:*

Be it known that I, PATRICK F. O'DWYER, of Waltham, county of Middlesex, and State of Massachusetts, have invented an Improvement in Instruments for Supporting Shafting while Applying Bearings Thereto, of which the following description, in connection with the accompanying drawings, is a specification, like letters on the drawings representing like parts.

My invention relates to an instrument for supporting shafting, being especially useful for supporting a counter-shaft while new bearings are being substituted for old or worn-out ones, or in setting up shafting.

The instrument is especially useful for counter-shafts having bearings at each end only, which bearings are supported on hangers themselves fastened to the ceiling of the room or apartment in which the counter-shaft is used.

When it is required to apply a new bearing, it is usually necessary to build up a staging to support the shaft while the old bearing is being removed and a new one substituted, this involving considerable labor and expenditure of time.

The object of my invention is to provide a device that can be attached or applied to the hanger and engaged with the shaft, so as to support the same from the hanger independently of the regular bearing for the shaft, and so as to admit of and provide means for producing such movements of the shaft with relation to the hanger as are required in applying the box or bearing, or performing other operations which do not require the taking down of the shaft, but do require that it shall be supported independently of its bearing for a time.

The invention is embodied in an instrument comprising an arm that may be applied to and clamped or otherwise securely attached to some part of the hanger, and a hook or shaft-support adjustably connected with said arm, so that it may be engaged with the shaft at one side of its bearing and afford a support for the shaft, and may also be moved as much as is required to make the changes in the position of the shaft needed for the operations upon it or its bearing.

Figure 1:
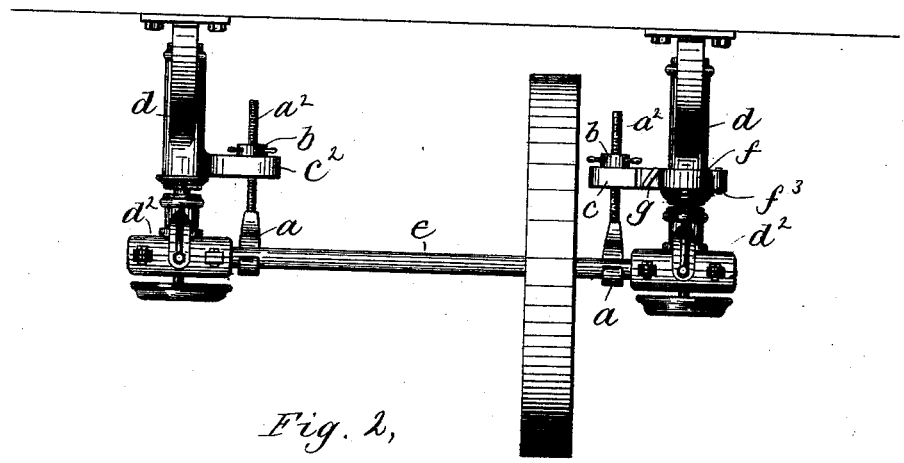
Figure 2:
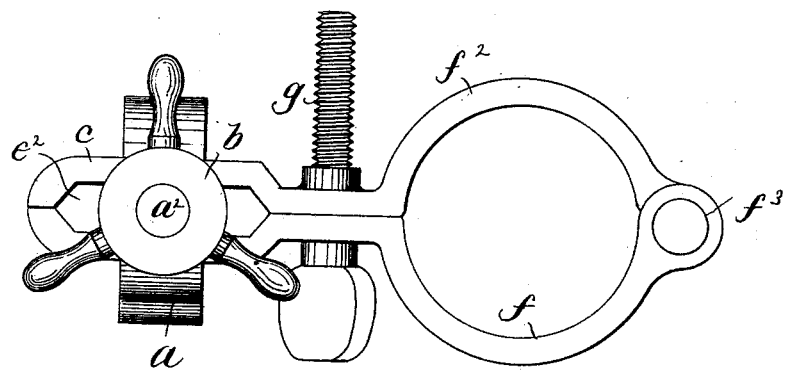

Figure 1 is a side elevation of a counter-shaft and its two hangers, each provided with a shaft-supporting instrument embodying this invention, one of said supports being represented in a modified construction; and Fig. 2 is a plan view of a shaft-supporting instrument represented at the right hand of Fig. 1.

The instrument comprises a support $a$ for the shafting, which may be made in the form of a hook to pass beneath the shaft, and is shown as provided with a threaded shank $a^2$, engaged with an adjusting-nut $b$, which rests upon the supporting-arm $c$, that is in the operation securely connected with the hanger $d$ for the counter-shaft $e$. As shown at the right hand of Fig. 1 and in the plan view of Fig. 2, the arm $c$ is formed at the end of two clamping-jaws or half-rings $f f^2$, hinged or pivoted together at $f^3$, so that they may be opened to pass around the hanger $d$, the said jaws being acted upon by a clamping-screw $g$, by which they may be tightly closed upon the hanger. When so closed, the projections form an arm having an elongated space or slot $e^2$ between them, through which the shank $a^2$ of the shaft-support $a$ passes, and in which the said shank may be moved toward or from the hanger $d$, so as to permit the engagement of the hook $a$ with the shaft at one side of the box or bearing portions $d^2$ of the hanger.

When the instrument is in position, as shown in Fig. 1, the cap of the box of the hanger may be removed and the underneath bearing of the shaft taken off while the shaft remains supported on the hook $a$, and if it is necessary to lower the shaft—as, for example, to remove the upper box and substitute a new one—the shaft may be lowered sufficiently by turning the nut $b$, and when the bearing has been properly placed the shaft may be again raised by turning the nut $b$ in the other direction, thus enabling the lower bearing and cap of the box to be replaced, so that the shaft will be properly supported by its usual bearing, after which the instrument employed in the operation may be removed.

It is obvious that the construction of the instrument may be widely varied, and it might in some cases be desirable to make the supporting-arm $c$ for the hook or shaft-support an integral part of the hanger-casting, as represented at $c^2$ at the left hand of Fig. 1, and the invention is not limited to the exact construction of the instrument illustrated, although that is believed to be very efficient and convenient for general use.

I claim—

An instrument for supporting shafting independently of its bearing, comprising an arm connected with the shafting-hanger, and a shaft-support connected with the said arm, substantially as and for the purpose described.

In testimony whereof I have signed my name to this specification in the presence of two subscribing witnesses.

PATRICK F. O'DWYER.

Witnesses:
W. S. ABBOTT,
H. W. SMITH.